(12) United States Patent
Mok et al.

(10) Patent No.: US 6,746,592 B1
(45) Date of Patent: Jun. 8, 2004

(54) PROCESS FOR REMOVING ALUMINUM SPECIES FROM ALKALI METAL HALIDE BRINE SOLUTIONS

(75) Inventors: Felix Mok, Vancouver (CA); R. Ganapathy Subramanian, Madras (IN)

(73) Assignee: Kvaerner Canada, Inc., Vancouver (CA)

(*) Notice: Subject to any disclaimer, the term of this patent is extended or adjusted under 35 U.S.C. 154(b) by 0 days.

(21) Appl. No.: 09/361,626

(22) Filed: Jul. 27, 1999

(51) Int. Cl.[7] .............................. C25B 1/16; C02F 1/52
(52) U.S. Cl. ...................... 205/516; 205/536; 210/712; 210/726; 423/182
(58) Field of Search ................ 210/712, 724, 210/726; 205/516, 536; 423/182, 198

(56) References Cited

U.S. PATENT DOCUMENTS

| | | | | |
|---|---|---|---|---|
| 3,816,592 A | * | 6/1974 | Rinaldi et al. | ............... 423/140 |
| 4,073,706 A | * | 2/1978 | Nagy | ........................ 423/198 |
| 4,155,820 A | * | 5/1979 | Ogawa et al. | ............... 205/536 |
| 4,450,057 A | * | 5/1984 | Kelly | ........................ 210/681 |
| 4,966,764 A | * | 10/1990 | Reed et al. | .................. 210/726 |

* cited by examiner

Primary Examiner—Ivars C. Cintins
(74) Attorney, Agent, or Firm—Morgan, Lewis & Bockius LLP

(57) ABSTRACT

A method for the reduction of soluble aluminum species in an evaporated salt alkali metal halide brine containing up to 500 ppb aluminum species to provide a brine feedstock suitable for use in a chlor-alkali membrane cell process, said method comprising treating said brine with a magnesium salt in an amount to provide a Mg to Al molar ratio selected from 5–20 to 1 at a Mg concentration selected from 0.5–10 ppm, and sufficient alkali metal hydroxide to provide an excess alkalinity concentration of between 0.1–0.5 g/L alkali metal hydroxide to effect precipitation of a magnesium aluminum hydroxide complex; and removing said complex to provide said brine feedstock.

9 Claims, 1 Drawing Sheet

US 6,746,592 B1

PROCESS FOR REMOVING ALUMINUM SPECIES FROM ALKALI METAL HALIDE BRINE SOLUTIONS

FIELD OF THE INVENTION

This invention relates to chlor-alkali membrane electrolytic cells particularly to brine as a feedstock for said cells and, more particularly, to removal of aluminum species from said feedstock.

BACKGROUND OF THE INVENTION

The quality of feed brine solution required for a modern chlor-alkali plant equipped with membrane cells is much more stringent than conventional diaphragm and mercury operations. The electrical efficiency of the membrane cells is easily compromised by the presence of various cationic and anionic impurities commonly found in the metal halide brine feedstock. A concentration of greater than 20 ppb of calcium or magnesium in the feed brine results in physical disruption of the sulfonic/carboxyl layers membrane interface through deposition of insoluble precipitates of these metals. A feed brine solution containing more than 100 ppb aluminum and greater than 10 ppm silica leads to precipitation of aluminosilicate near the cathode surface which ultimately damages the membrane separator and significantly affects its sodium and water transport properties. Hence, the control of the concentration of these impurities to their respective acceptable maximum concentrations is crucial to prevent membrane degradation and anode blinding.

In order to achieve a high purity feed brine using solar salt or rock salt as a raw material, both primary and secondary brine treatment processes are employed. During the primary treatment operation, caustic and soda ash are added either together or in series to a treatment tank to initiate primary precipitation of calcium as calcium carbonate and magnesium as magnesium hydroxide, the two main cationic impurities present in solar and rock salt. This is followed by secondary precipitation or co-precipitation of other cationic impurities such as aluminum, iron, barium, manganese, strontium, cobalt, nickel and like heavy metals, which are also commonly found in the feedstock salt, but in much lower concentrations than the alkali earth metals. The secondary co-precipitation process usually involves physical occlusion and/or adsorption onto primary precipitates, and is a much slower reaction than the primary precipitation. Hence, related kinetic factors such as residence time, temperature and reactant concentrations must be optimized to ensure the effective removal of these impurities. This is normally achieved by use of a large capacity clarifier operated with sludge recirculation, consisting mainly of the primary precipitates, calcium carbonate and magnesium hydroxide. The subsequent clarified solution is then filtered through conventional press or leaf filters, and the resulting filtered solution, usually Containing less than 10 ppm of calcium and magnesium cations, is then introduced to a secondary treatment system equipped with cation-exchange resins. All the major cationic impurities are reduced through chelation to the trace level of less than 50 ppb, a standing maximum concentration which membrane manufacturers accept for use in chlor-alkali membrane electrolysis. However, the cationic exchange activities of most of these impurities, particularly calcium and magnesium, are best effected under alkaline conditions, such as, pH 9 to 11, when using iminodiacetic or aminophosphlonic functionalized chelating resins. Techniques for the primary and secondary brine treatment processes are well-known in the art.

Thus, the primary and secondary treatments are effective in removing most major cationic impurities under alkaline conditions, except aluminum and silica under alkaline pH 9 to 11. At this pH, the anionic complexes, aluminate ($AlO_2$) and metamonosilicate ($HSiO_3$) predominate, which renders their removal by primary and secondary treatment processes to be limited.

A number of different processes have been used to attempt to remove and control the aluminum species concentration in alkali brine. One method is described in U.S. Pat. No. 4,450,057, issued May 22, 1984 to Olin Corporation, which discloses the acidification of saturated alkali metal halide brine to a pH of between 2.0 to 3.0 to convert the aluminum species present to the soluble cationic form $Al^{3+}$, followed by contact of the acidic brine with a strong macroreticular cationic chelating resin to remove the dissociated aluminum cations at the negative hydroxyl sites on the resin.

However, in the cationic exchange process, the highly mobile hydrogen ions from the acidic brine compete with the less mobile trivalent aluminum cations for the chelating sites on the resin, and as a result, the neutralization of these negative hydroxyl sites with the hydrogen ions significantly lowers the dynamic loading capacity of the clielating resin by making it less effective for aluminum removal. Moreover, tile required frequent regeneration of the resin bed leads to additional capital and operating costs.

U.S. Pat. No. 4,966,764, issued on Oct. 30, 1990 to Olin Corporation describes the removal of aluminum in brine in the calcium chloride feed stream by recycling brine from the calcium carbonate settler at a lower pH to solubilize the aluminum, followed by raising the pH to reprecipitate the aluminum onto carrier particles with high surface area to facilitate removal. Although this technique addresses the gradual increase in aluminum concentration within a closed-loop chlor-alkali brine circuit, it does require a large standing inventory of calcium carbonate settler solids along with additional large holding vessels and associated equipment. Moreover, during the acidification of these solids to solubilize the aluminum much of the other precipitated cationic impurities also dissolve. This not only results in greater consumption of hydrochloric acid, but also in caustic usage when these dissociated impurities are reprecipitated through recausticization for subsequent separation. In addition, with the ever increasing awareness on environmental protection pressure has been mounting on chemical manufacturers such as chlor-alkali producers to limit their plant outflows, both liquids and solids, and hence the need to continually dispose large quantity of sludge materials containing heavy metals clearly poses an environmental concern.

Two other references, one entitled "The Removal of Aluminum From The Recovery System Of A Closed Kraft Pulp Mill" by Per Ulmgren of Swedish Forest Products Research Laboratory, and the other entitled "The Solubility Of Aluminosilicates In Kraft Green And White Liquors" by P. N. Wannenmacher of Oregon State University, W. J. Frederick of The Institute of Paper Science and Technology, and K. A. Hendrickson and K. L. Holman both of Weyerhaeuser Company, have also described the effective removal of aluminum and silica from green and white liquors by precipitation with magnesium salts and efficient dregs removal. However, these techniques are developed to remove high levels of aluminum and silica concentrations present in highly alkaline solutions such as pulping liquors where titratable alkali content normally exceeds 160 g/L NaOH, and the residual aluminum content after such treatment still remains at the 10 ppm region despite using an optimum Mg/Al molar ratio and 24 hours of residence time.

In addition, it is well-known that aluminum and its dissociated complexes are amphoteric in nature and since the precipitation reactions are carried out under strongly alkaline conditions the resulting equilibrium concentration of aluminum complexes is significantly affected.

In consequence of increasing environmental consciousness coupled with highly competitive markets, modern chlor-alkali producers are forced to look to alternate ways to not only reduce operating and capital costs, but to also minimize the amount of solids and liquids effluents. The current solution to these problems is to replace the solar or rock salt raw materials with evaporated salt which is a much purer and cleaner salt having amounts of alkali earth metals and other heavy metals orders of magnitude lower in concentration. Upon dissolution of the purer salt, the resulting brine solution quality is such that the conventional primary treatment process can be eliminated.

However, within a brine circuit where the purge of sludges through primary treatment operation is no longer available, impurities such as aluminum and silica, which cannot be effectively removed by the secondary brine treatment process using cationic chelating resins, begin to accumulate in the saturator where make-up salt is continually added to mix with the returning recycled weak brine. Any upset in pH control of the weak brine solution flowing to the saturator, particularly at a pH above 10, leads to an unacceptable problem as the accumulated impurities, mainly aluminum and silica, dissolve into the brine. This causes an excursion of high aluminum brine being fed to the electrolyzer where the membrane separators are adversely affected.

U.S. Pat. No. 4,073,706 issued Feb. 12, 1978 to Diamond Shamrock, describes a process for the removal of trace metals from alkali metal halide brine. The addition of controlled amounts of magnesium ions to brine and subsequent precipitation of magnesium hydroxide removes contaminants, and provides a brine suitable for use in the electrolytic production of chlorine and alkali metal hydroxide, specifically for mercury or diaphragm chlor-alkali applications wherein concentrations of impurities in feed brine is much less stringent than for current chlor-alkali membrane operations. Furthermore, the brine is of a solar or rock salt origin having cationic impurities such as calcium of greater than 10 ppm concentration. This increases the magnesium requirement needed to effectively achieve aluminum removal. Further, U.S. Pat. No. 4,073,706 states that a magnesium level less than 5 ppm concentration was found to be ineffective in removing many of the other undesirable metal impurities, as indicated in its example where no removal of aluminum is achieved with a brine solution containing 1 ppm aluminum impurity using only 2.5 ppm magnesium and 0.1 g/L NaOH after 20 minutes.

There remains therefor a need for an improved method for the removal of aluminum species from brine for use in chlor-alkali membrane electrolytic processes.

SUMMARY OF THE INVENTION

It is an object of the present invention to provide an efficient and economical process for the removal and control of aluminum species from a chlor-alkali membrane cell using brine system.

Accordingly, in one aspect the invention provides a method for the reduction of soluble aluminum species in an evaporated salt alkali metal halide brine containing up to 500 ppb aluminum species to provide a brine feedstock suitable for use in a chlor-alkali membrane cell process, said method comprising:

(a) treating said brine with a magnesium salt in an amount to provide a Mg to Al molar ratio selected from 5–20 to 1 at a Mg concentration selected from 0.5–10 ppm, and sufficient alkali metal hydroxide to provide an excess alkalinity concentration of between 0.1–0.5 g/L alkali metal hydroxide to effect precipitation of a magnesium aluminum hydroxide complex; and (b) removing said complex to provide said brine feedstock.

By the term "evaporated salt alkali metal halide brine" is meant herein, a brine produced from salt having the approximate amounts of elements set forth in Table I.

TABLE 1

| Elements | Evaporated Salt (European) | |
|---|---|---|
| | In Salt (ppm or mg/kg) | In 300 g/L NaCl (ppm or mg/kg) |
| Aluminum | 0.018 | 0.005 |
| Barium | <0.003 | <0.001 |
| Boron | <0.3 | <0.1 |
| Calcium* | 2.5 | 0.64 |
| Chromium | <0.03 | <0.01 |
| Copper* | 0.10 | 0.03 |
| Lead | <0.007 | <0.002 |
| Magnesium | 0.43 | 0.13 |
| Manganese* | <0.017 | <0.005 |
| Mercury | <0.003 | <0.001 |
| Nickel* | <0.9 | <0.2 |
| Potassium | 110 | 30 |
| Iron (Anti-caking) | 4.6 | 1.38 |
| Iron as Fe* | <0.3 | <0.1 |
| Silica ($SiO_2$) | 1.4 | 0.36 |
| Sulfate | 30 | 10 |
| Fluoride | <0.1 | <0.1 |
| Strontium* | <0.07 | <0.02 |
| Moisture | 2.7% | NA |

The elements with the asterisk (*) notations will suppress aluminum removal using magnesium chloride, if present in relatively high concentration of greater than 10 ppm.

Preferably, the Mg to Al molar ratio is controlled to about 10:1, i.e. 10±2:1; the Mg concentration to about 2–5 ppm and the excess alkalinity to about 0.3 g/L, i.e. 0.1–0.2 g/L alkali metal hydroxide.

The magnesium salt is preferably magnesium chloride preferably added as an aqueous solution of 1–5% w/w $MgCl_2$. The alkali metal hydroxide is preferably sodium hydroxide and which is added as a 30% w/w NaOH solution.

Although the alkali metal hydroxide and magnesium salt may be added in any order one after the other or, simultaneously, most preferably, the hydroxide is added immediately after the magnesium salt addition followed by static mixing.

Thus, the present invention provides for the effective removal of dissolved aluminum impurities from an alkali metal halide brine of evaporated salt origin for use in the chlor-alkali membrane electrolytic operation, preferably a closed loop system, by precipitation by the addition of trace amounts of magnesium salts, preferably magnesium chloride, and caustic solution, followed by filtration through conventional filters, such as, plate or leaf filters.

The process according to the invention involves the following general steps:

(a) adding a dilute magnesium chloride solution from a stock tank to an aluminum-contaminated brine, having a pH between 5 to 9, flowing downstream of the saturator, where evaporated salt is continually added for brine reconcentration;

(b) adding a dilute sodium hydroxide solution from a stock tank to a brine solution flowing downstream of the magnesium addition step;

(c) mixing the aluminum-contaminated brine with the magnesium chloride and sodium hydroxide to initiate the primary precipitation process through turbulent flow motion created by, preferably, a static mixer;

(d) filtering the treated brine solution through a conventional plate or leaf filter to remove the fine precipitates containing aluminum impurity; and (e) analysing the residual aluminum concentration in the filtered brine with an in-line aluminum analyzer and controlling the addition of magnesium chloride to achieve optimal condition for aluminum removal.

The aluminum removal process according to the present invention using trace magnesium chloride addition, preferably controls the aluminum impurities concentration below 100 ppb in a chlor-alkali brine circuit where only a low magnesium-containing salt e.g. an evaporated or vacuum salt is used. Upon the dissolution of this type of salt in demineralized water, the resulting quality of this concentrated sodium chloride solution is already suitable to be fed directly to the ion-exchange system for final purification without the use of a primary brine treatment system where sodium hydroxide and sodium carbonate are added to precipitate the main cationic impurities of calcium carbonate and magnesium hydroxide, along with co-precipitation of other cationic impurities.

The magnesium chloride addition system according to the invention safe-guards against any break-through of high excursion of aluminum concentration ill this brine due to sudden upset of saturator pH condition, e.g. pH greater than 10, where undissolved aluminum impurities accumulated over time are preferentially dissolved, or continual ingress of aluminum impurities through means of other chemical or raw material additions.

Based on plant operating data and results from experimental testing, according to the present invention, a brine solution containing 100 to 200 ppb aluminum at 50 to 70° C. can be effectively reduced to levels between 10 to 20 ppb aluminum at 0.1 to 0.2 g/L excess alkalinity expressed as NaOH in less than one minute of reaction time. This translates to a Mg/Al molar ratio of 10 to 1 and a removal efficiency of 90%. Operating outside this limit, especially with low Mg/Al ratio and excess alkalinity above 0.4 g/L have been confirmed to significantly lower the aluminum removal efficiency, where too high of a Mg/Al working ratio leads not only to greater chemical consumption and more frequent replacement and cleaning of the filter medium, but adversely affects hydroxide precipitation reaction. Whereas too high of an excess alkalinity level results in the resolubilization of the complex magnesium/aluminum precipitate. Reversing the sequence of magnesium chloride and sodium hydroxide additions to the Al containing brine also leads to lower efficiency of aluminum removal, i.e. lower than 90%.

BRIEF DESCRIPTION OF THE DRAWINGS

In order that the invention may be better understood, a preferred embodiment will now be described, by way of example only, with reference to the accompanying drawing wherein.

DETAILED DESCRIPTION OF THE PREFERRED EMBODIMENT

Figure 1:
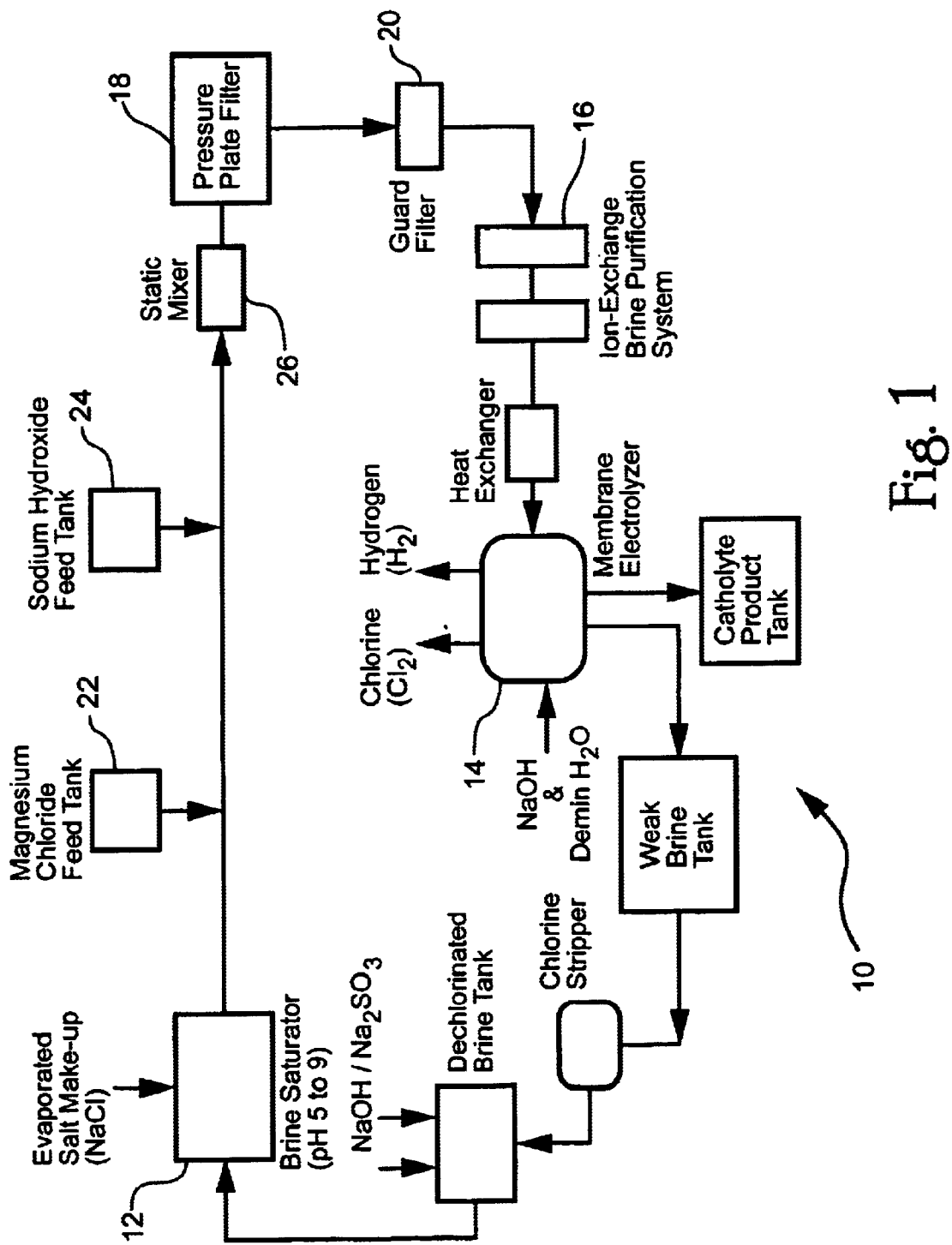
FIG. 1 is a block schematic drawing of a chlor-alkali membrane electrolytic system comprising an aluminum removal process according to the invention.

In this process, concentrated alkali metal halide brine solution, namely a sodium chloride solution of evaporated salt origin of pH between 5 to 9, containing over 100 ppb of aluminum, the maximum allowable concentration set Out by chlor-alkali membrane suppliers, is added with a metered amount of magnesium salt, preferably magnesium chloride to derive a magnesium concentration in the brine solution to be no less than 0.5 ppm, preferably between 1 to 5 ppm for optimal removal of aluminum concentration between 100 to 500 ppb, followed by addition of alkali metal hydroxide solution, preferably sodium hydroxide, to achieve an excess alkalinity concentration in the resulting brine of no less than 0.1 g/L NaOH, preferably between 0.1 to 0.5 g/L.

In this state, the brine containing the three reactants present at their optimal concentrations are mixed as they flow through a static mixer where turbulent motion is created. The resulting action leads to an almost instantaneous complex precipitation reaction with aluminum removal efficiency above 90%. The treated brine is then filtered through a pressure plate or leaf filter precoated with an alpha-cellulose layer to minimize potential passing of the finely suspended precipitates. As the aluminum concentration in the brine increases due to continual ingress of aluminum impurities from raw materials or sudden upset in pH control of spent brine flowing to the saturator, the amount of magnesium require to precipitate the aluminum also increases. Preferably, the filtered solution is, thus, continuously monitored for its residual aluminum content with an in-line analyzer. The result is used to make adjustment of the magnesium addition system for maximum aluminum removal.

Although the reaction kinetics of this aluminum removal precipitation mechanism is instantaneous and increase in residence time does not significantly improve the overall removal efficiency, a balance exists between the magnesium concentration and excess alkalinity level. Once all the magnesium is consumed to form the bimetal hydroxide complex precipitates of an amphoteric nature, any excess hydroxide ions tend to resolubilize the complex precipitates and, thus, release the dissolved aluminum impurities back into the brine solution as indicated by the lower removal efficiency at the higher excess alkalinity concentration.

In a preferred aspect of the process of the invention, to maximize the primary reaction mechanism by controlling the addition sequence of magnesium salt and alkali metal hydroxide solutions to the aluminum-contaminated brine, magnesium salt solution is first added prior to the addition of alkali metal hydroxide solution. The effective aluminum removal reaction is almost instantaneous, with removal efficiency reaching above 90%. If the aforesaid chemical addition sequence is reversed the reaction rate is significantly affected to provide a below 90% aluminum removal efficiency.

Other trace metallic impurities such as manganese, iron, lead, nickel and cobalt which are commonly present in brine can also be removed to a lesser degree, through the trace magnesium precipitation process according to the present invention.

EXAMPLE 1

Reference is now made to the chlor-alkali membrane brine circuit shown generally as 10 in FIG. 1.

Optimal operating conditions for treating a brine solution containing 20 to 500 ppb aluminum to achieving a 90% removal efficiency are as follows:

Magnesium to Aluminum molar ratio: 10 to 1 0.9 ppm Mg for 100 ppb Al 4.5 ppm Mg for 500 ppb Al Excess Alkalinity Level expressed as NaOH: 0.1 to 0.2 g/L Temperature: 50 to 70° C.

A concentrated sodium chloride brine solution containing between about 295 and about 310 grams per litre of NaCl and more than 100 ppb of aluminum at a temperature of between 55 to 65 degrees Celsius was formed by resaturation of spent brine in saturator 12 from a chlor-alkali membrane cell 14 consisting of between about 180 and 220 grams per litre of NaCl with evaporated salt at a pH of between 5 to 9. During the process of brine reconcentration, the aluminum concentration increases to greater than 100 ppb, generally, between 100 to 200 ppb but could be as high as above 500 ppb if the saturator pH were over 10.5, caused by dissolution of the incoming salt and/or leaching of the aluminum impurities accumulated over time within the saturator. Flowing downstream of saturator 12 to the ion-exchange system 16 via filtration units 18, 20 a dilute magnesian chloride solution was added from tank 22 through a metering pump (not shown) to the reconcentrated sodium chloride solution containing au aluminum level of between 100 to 500 ppb. The final concentration of magnesium in the brine was between 1 to 5 ppm, at a Mg to Al molar ratio of 10 to 1. The magnesium addition step was immediately followed by the addition of 32% w/w sodium hydroxide solution from tank 24 to achieve an excess alkalinity level at 0.1 to 0.5 grams per litre NaOH, preferably between 0.1 to 0.2 g/L, or a nominal pH of between 10.1 to 10.3. The resulting solution was fed through a static mixer 26 where turbulent motion promotes the primary precipitation reaction without the need for additional reaction time. The treated brine mixture containing a very finely suspended precipitate of complex magnesium aluminum hydroxide was then passed to and filtered through pressure plate filter system 18 precoated with a thin layer of alpha-cellulosic fibre materials, preferably Solka-Floc, to maximize the removal of the formed solid precipitates before sending to the ion-exchange brine purification system. At this point, the filtered brine solution when analyzed for the residual aluminum concentration was found to contain less than 100 ppb, an acceptable concentration set out by all membrane suppliers, with removal efficiency in the 90% region.

Table 2 shows the typical results in a process as hereinbefore described for values starting aluminum contaminant concentration (column I), amount of magnesium addition (column II) and excess alkalinity (column III).

TABLE 2

| Al (ppm) (I) | Mg (ppm) (II) | Excess NaOH (g/L) (III) | Residual Al (ppm) | Removal Efficiency (%) |
| --- | --- | --- | --- | --- |
| 0.1 | 1.0 | 0.1 | 0.009 | 91 |
| 0.1 | 2.0 | 0.1 | 0.012 | 88 |
| 0.1 | 1.0 | 0.2 | 0.013 | 87 |
| 0.1 | 2.0 | 0.2 | 0.011 | 89 |
| 0.1 | 1.0 | 0.5 | 0.028 | 72 |
| 0.1 | 2.0 | 0.5 | 0.020 | 80 |
| 0.2 | 1.0 | 0.1 | 0.065 | 68 |
| 0.2 | 2.0 | 0.1 | 0.020 | 90 |
| 0.2 | 1.0 | 0.2 | 0.103 | 49 |
| 0.2 | 2.0 | 0.2 | 0.033 | 84 |

TABLE 2-continued

| Al (ppm) (I) | Mg (ppm) (II) | Excess NaOH (g/L) (III) | Residual Al (ppm) | Removal Efficiency (%) |
| --- | --- | --- | --- | --- |
| 0.2 | 1.0 | 0.5 | 0.109 | 46 |
| 0.2 | 2.0 | 0.5 | 0.055 | 73 |

Although this disclosure has been described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. A method for the reduction of soluble aluminum species in an evaporated salt alkali metal halide brine containing up to 500 ppb aluminum species to provide a brine feedstock suitable for use in a chlor-alkali membrane cell process, said method comprising:

(a) treating said brine with a magnesium salt in an amount to provide a Mg to Al molar ratio selected from 5–20 to 1 and at a Mg concentration of from 0.5 to 5 ppm, and sufficient alkali metal hydroxide to provide an excess alkalinity concentration of between 0.1–0.3 g/L alkali metal hydroxide to effect precipitation of a magnesium aluminum hydroxide complex; and (b) removing said complex to provide said brine feedstock.

2. A method as defined in claim 1 wherein said Mg to Al molar ratio is about 10:1 and said Mg concentration is from 1 to 5 ppm.

3. A method as defined in claim 1 wherein said brine, said magnesium salt and said alkali metal hydroxide are subjected to vigorous mixing.

4. A method as defined in claim 1 wherein said brine is treated with said magnesium salt prior to treatment with said alkali metal hydroxide.

5. A method as defined in claim 1 wherein said magnesium salt and said alkali metal hydroxide are added to said brine as aqueous solutions.

6. A method as defined in claim 1 wherein said magnesium salt is magnesium chloride and said alkali metal is sodium.

7. A method as defined in claim 1 wherein said treating is carried out at 50–70° C. and the excess alkalinity is between 0.1 to 0.2 g/L alkali metal hydroxide and further comprising determining the concentration of aluminum species in said feedstock and adding magnesium salt to provide said Mg to Al ratio within said Mg concentration.

8. In a chlor-alkali membrane cell process employing a brine feedstock, the improvement wherein said feedstock is obtained by the method of claim 1.

9. A chlor-alkali membrane cell process according to claim 8 which is closed loop.

* * * * *